(12) United States Patent
Hamada

(10) Patent No.: US 7,421,185 B2
(45) Date of Patent: Sep. 2, 2008

(54) OPTICAL RECEIVING DEVICE, FREE SPACE OPTICS TRANSMISSION APPARATUS, RECEIVING APPARATUS

(75) Inventor: Hidenobu Hamada, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 44 days.

(21) Appl. No.: 11/672,197

(22) Filed: Feb. 7, 2007

(65) Prior Publication Data

US 2007/0181776 A1 Aug. 9, 2007

(30) Foreign Application Priority Data

Feb. 8, 2006 (JP) ............................. 2006-031617

(51) Int. Cl.
| | |
|---|---|
| *G02B 6/10* | (2006.01) |
| *G02F 1/295* | (2006.01) |
| *G02F 1/00* | (2006.01) |
| *H01S 3/00* | (2006.01) |
| *H04B 10/00* | (2006.01) |

(52) U.S. Cl. ........................... 385/146; 385/4; 359/321; 359/349; 398/129

(58) Field of Classification Search ................... 117/2, 117/68, 84; 359/321, 332, 349; 385/4, 27, 385/129, 146; 398/207, 212, 214
See application file for complete search history.

(56) References Cited

U.S. PATENT DOCUMENTS

| 6,621,644 B2 | 9/2003 | Tokushima |
| 7,335,962 B2 * | 2/2008 | Mouli ......................... 257/432 |
| 2003/0113074 A1 * | 6/2003 | Kohlstadt et al. ............. 385/92 |
| 2005/0281524 A1 * | 12/2005 | Mouli ......................... 385/129 |
| 2007/0127019 A1 * | 6/2007 | Zribi et al. .................. 356/301 |

FOREIGN PATENT DOCUMENTS

| JP | 2003-050325 | 2/2003 |
| JP | 2004-347759 | 12/2004 |
| JP | 2005-203676 | 7/2005 |

* cited by examiner

*Primary Examiner*—David N Spector
(74) *Attorney, Agent, or Firm*—RatnerPrestia

(57) ABSTRACT

An optical receiving device includes an optical receiving element and a light collecting portion having an output surface close to or in contact with the optical receiving surface of the optical receiving element. The dispersion plane at an arbitrary point on the line connecting an arbitrary point on an input surface of the light collecting portion to the optical receiving point where light inputted on the arbitrary point on the input surface is received on the optical receiving surface of the optical receiving element is flat, and the normal to the dispersion plane is parallel to the line.

16 Claims, 12 Drawing Sheets

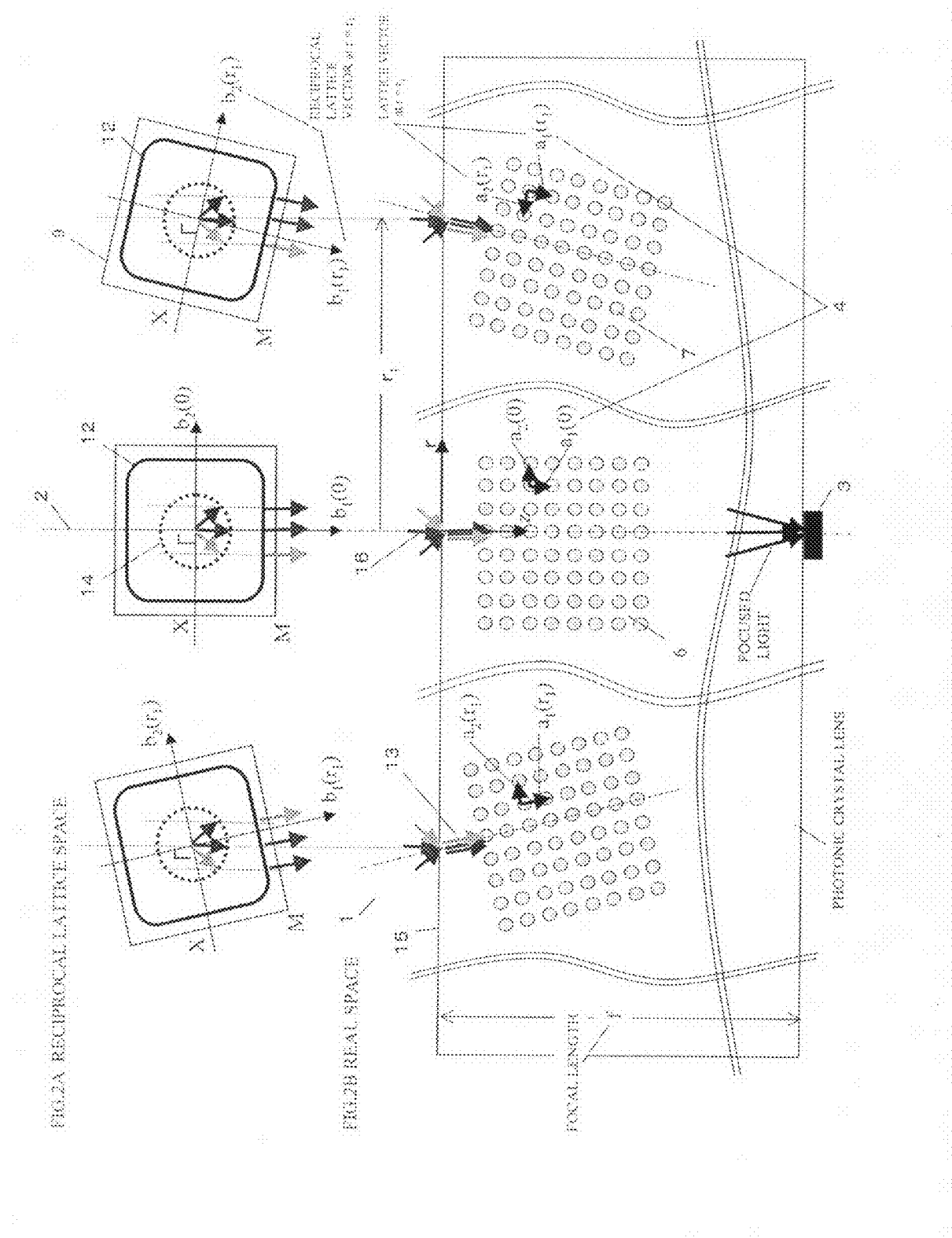

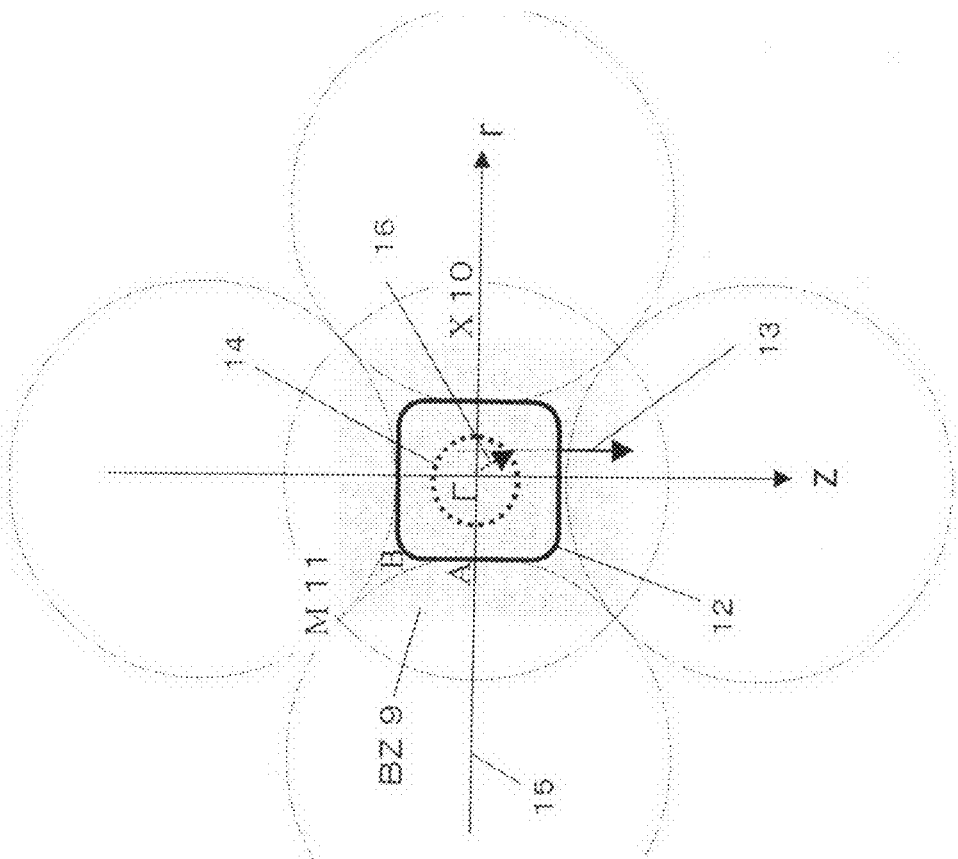
FIG.3B  DISPERSION PLANE OF SQUARE LATTICE ON OPTICAL AXIS
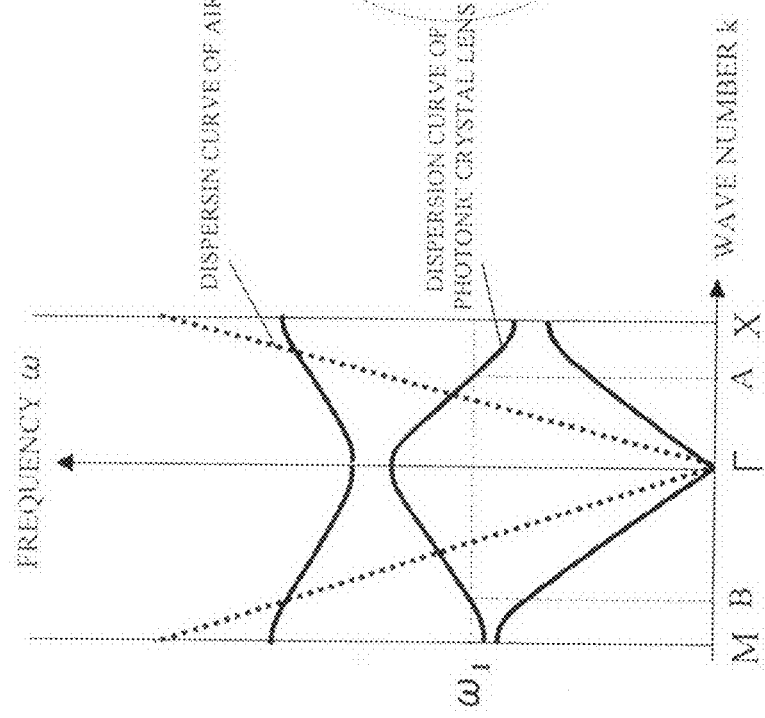
FIG.3A  PHOTONIC BAND DIAGRAM OF Brillouin zone (BZ)

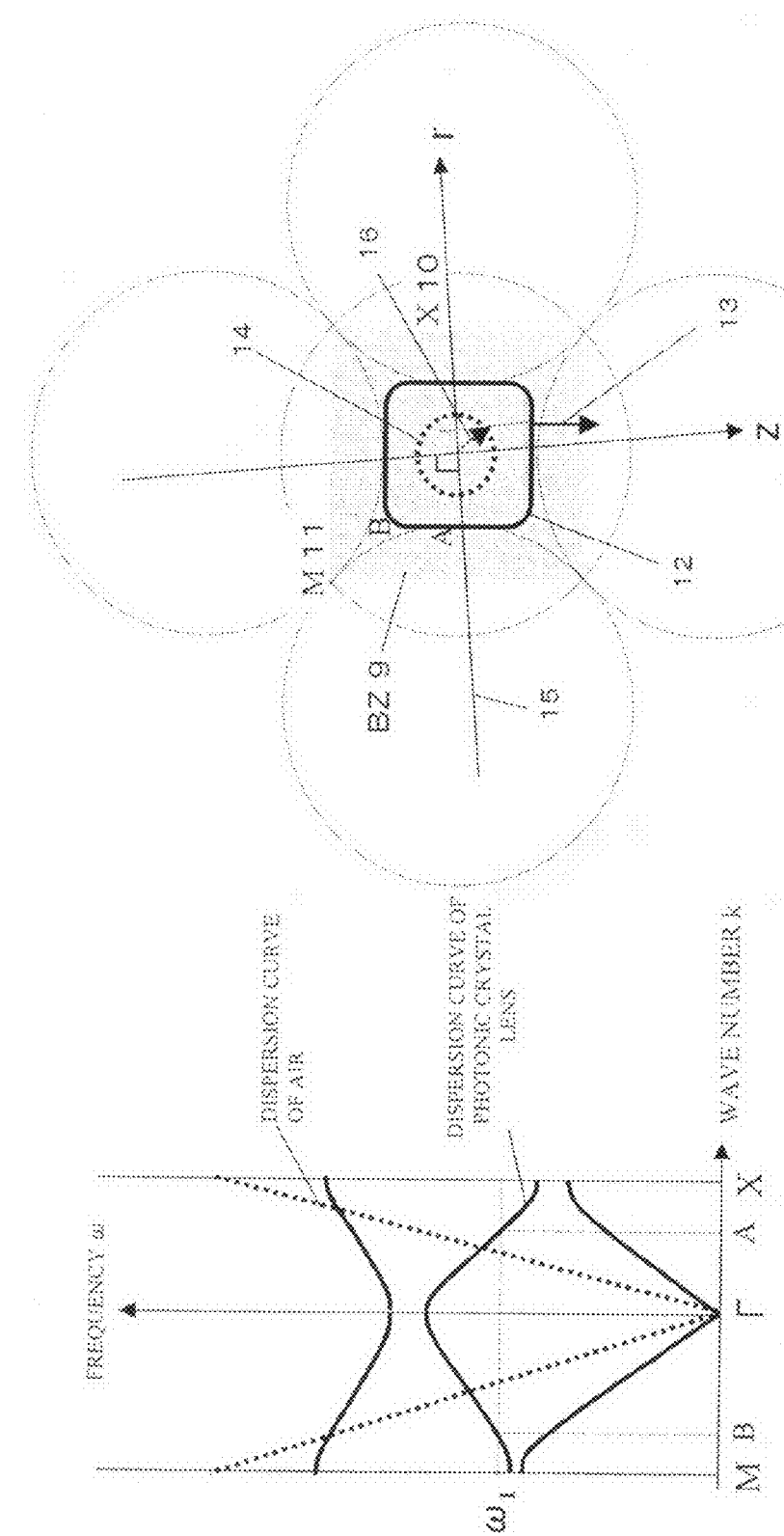

OPTICAL RECEIVING DEVICE, FREE SPACE OPTICS TRANSMISSION APPARATUS, RECEIVING APPARATUS

BACKGROUND OF THE INVENTION

1. Field of the Invention

The present invention relates to an optical receiving device, a free space optics transmission apparatus and a receiving apparatus used in free space optics transmission. For example, the present invention relates to an optical receiving device, a free space optics transmission apparatus and a receiving apparatus that use a photonic crystal to collect light.

2. Related Art of the Invention

In free space optics transmission, it is ideal to align the optical axis of a transmitter with that of a receiver. However, there is practically a static axis drift resulting from misalignment of a fixed transmitter with a fixed receiver or a dynamic axis drift when at least one of the transmitter and the receiver is a mobile apparatus.

Axis drift causes various problems, such as S/N degradation due to reduction in optical receiving level, reduction in transfer rate due to increase in error rate and increase in transmission power.

Furthermore, the fact that the faster an optical receiving element responds, the smaller the optical receiving area leads to greater impact of the axis drift. The axis drift described herein includes both positional and angular drifts.

In free space optics transmission, since the beam diameter increases to some extent during propagation in a free space, the angular drift is particularly more problematic than the positional drift. However, a conventional lens or the like for focusing light to a small-area optical receiving element has a dispersion plane that is an uncontrollable curved plane, so that the focusing position is sensitive to variation of the angle of incidence, resulting in degradation in gain.

In recent years, the study on photonic band engineering, in which a crystal lattice of a photonic crystal is designed to freely control a dispersion plane, has been active and some of the study results have been applied to imaging optical systems.

For example, there is an imaging optical system including a light collecting portion that collects incident light, a photonic crystal having a flat dispersion plane that propagates the incident light within a predetermined wavelength range in a fixed direction independent of the state of incidence (angle and position) and an optical receiving element (see Japanese Patent Laid-Open No. 2005-203676, for example).

FIGS. 10A and 10B are cross-sectional views showing a unit pixel of a solid-state imaging element disclosed as an imaging optical system in Japanese Patent Laid-Open No. 2005-203676. FIG. 10A shows the behavior of vertical incident light, and FIG. 10B shows the behavior of obliquely incident light.

The incident light comes from above a solid-state imaging element 200. An optical receiving element 102 (silicon p-i-n structure) is formed on a silicon substrate 101, and an aluminum light-blocking layer 103 for preventing smear is provided in the area except the opening above the optical receiving element 102. A photonic crystal 107 is formed such that the light-blocking layer 103 is embedded in the photonic crystal 107, and an acryl layer 104, a color filter layer 105 and a microlens 106 are formed above the photonic crystal 107. The focal length of the microlens 106 is adjusted such that the focal point coincides with the optical receiving surface of the optical receiving element 102.

FIG. 11 shows a specific structure of the photonic crystal 107 for blue light. In FIG. 11, light is incident at various angles from the left and exits from the right side (the optical receiving surface side). The photonic crystal 107 is a two-dimensional photonic crystal having a refractive index periodic structure in the X and Z directions and having a uniform refractive index in the Y direction. In $SiO_2$ having a refractive index of 1.45, spherically-shaped particles of $Si_3N_4$ (refractive index of 2.0) having a radius of 0.113 μm are three-dimensionally arranged at an interval of 0.25 μm to form a square lattice, and nine $Si_3N_4$ layers are formed in the light traveling direction.

FIG. 12 shows the dispersion plane of the blue photonic crystal 107 having such a structure. That is, the blue photonic crystal 107 has a substantially square dispersion plane for the light having a wavelength of 500 nm, which is substantially blue. When blue light is incident on the photonic crystal 107 having such a dispersion plane, the light travels in the direction perpendicular to the dispersion plane independent of the angle of incidence. In the solid-state imaging element 200, since the optical receiving element 102 is formed in the direction perpendicular to the dispersion plane for blue, blue light incident on the photonic crystal 107 will be parallel guided light in the photonic crystal 107, and the parallel guided light in its entirety is directed to the optical receiving element 102.

In FIG. 10A, incident light 109 is focused by the microlens 106, so that the spot diameter of the focused light decreases as the light passes through the color filter layer 105 and the acryl layer 104. However, once in the photonic crystal 107, the entire light is bent in the direction perpendicular to the optical receiving surface of the optical receiving element 102, so that the entire incident light passes through the opening of the light-blocking layer 103 and reaches the optical receiving element 102.

On the other hand, in FIG. 10B, oblique incident light 110 is focused by the microlens 106 and the spot diameter of the focused light decreases, as described above. When the focused light reaches the interface of the photonic crystal 107, the traveling direction of the light is directed in the direction perpendicular to the optical receiving surface of the optical receiving element 102. Thus, most of the oblique incident light 110 can also be focused onto the optical receiving element 102.

SUMMARY OF THE INVENTION

However, since the conventional imaging optical system shown in Japanese Patent Laid-Open No. 2005-203676 uses an optical lens, such as the microlens 106, to collect the light, aberrations of the optical lens affect the performance of light collection. Therefore, for example, the sensitivity changes according to the angle of incidence of the light.

An object of the present invention is to solve the above-described problems associated with the prior art and to provide an optical receiving device, a free space optics transmission apparatus and a receiving apparatus capable of precisely receiving incident light as independent of the angle of incidence as possible without using an optical lens.

The 1$^{st}$ aspect of the present invention is an optical receiving device comprising:

an optical receiving element; and a light collecting portion having an output surface close to or in contact with an optical receiving surface of the optical receiving element, wherein a dispersion plane at an arbitrary point on a line connecting an arbitrary point on an input surface of the light collecting portion to an optical receiving point where light inputted on the arbitrary point on the input surface is received on the optical receiving surface is flat, and the normal to the dispersion plane is parallel to the line.

The 2nd aspect of the present invention is the optical receiving device according to the 1st aspect of the present invention, wherein the light collecting portion is divided into blocks, each of which includes part of the input surface and part of the output surface, and a line connecting an arbitrary point on the input surface of each of the blocks to an optical receiving point where light inputted on the arbitrary point is received on the optical receiving surface of the optical receiving element crosses a perimeter of the block only at two points, that is, a point on the input surface and a point on the output surface.

The 3rd aspect of the present invention is the optical receiving device according to the 1st aspect of the present invention, wherein normals to the respective dispersion planes are symmetric about an optical axis of the optical receiving element.

The 4th aspect of the present invention is the optical receiving device according to the 1st aspect of the present invention, wherein the light collecting portion is made of a photonic crystal whose crystal lattice changes as a direction of the line changes.

The 5th aspect of the present invention is the optical receiving device according to the 4th aspect of the present invention, wherein the photonic crystal has a regular n-polygonal lattice (n is a natural number equal to or greater than three) and a first lattice vector of the crystal lattice orients in a direction toward the optical receiving point of the line.

The 6th aspect of the present invention is the optical receiving device according to the 5th aspect of the present invention, wherein the regular n-polygonal lattice that configures the photonic crystal is a regular n-polygonal lattice that is determined by the direction of the line, and a ratio of a maximum wave number to a minimum wave number in a specific direction of a Brillouin zone is $\sin(\pi/n)$.

The 7th aspect of the present invention is the optical receiving device according to the 4th aspect of the present invention, wherein the photonic crystal has a crystal lattice having less than three degrees of symmetry, a first lattice vector of the crystal lattice is parallel to an optical axis of the optical receiving element and orients toward the optical receiving element, another lattice vector of the crystal lattice is a lattice vector that changes according to the direction of the line, and an interior angle formed by the first lattice vector and the other lattice vectors is 90° or greater.

The 8th aspect of the present invention is the optical receiving device according to the 7th aspect of the present invention, wherein the photonic crystal is configured to have a lattice constant that is 0.4 to 0.6 times a predetermined wavelength and a circle having a radius of 0.08 to 0.3 times the predetermined wavelength on a lattice point.

The 9th aspect of the present invention is the optical receiving device according to the 4th aspect of the present invention, wherein each of lattice vectors of the crystal lattice of the photonic crystal are symmetric about an optical axis of the optical receiving element.

The 10th aspect of the present invention is the optical receiving device according to the 1st aspect of the present invention, wherein normals to the respective dispersion planes are parallel to the line at a predetermined wavelength, and the dispersion plane is wavelength-dependent.

The 11th aspect of the present invention is the optical receiving device according to the 10th aspect of the present invention, wherein the light collecting portion focuses only light having the predetermined wavelength onto the optical receiving element.

The 12th aspect of the present invention is a free space optics transmission apparatus comprising an optical receiving unit having the optical receiving device according to the 1st aspect of the present invention.

The 13th aspect of the present invention is a receiving apparatus comprising:

a light transmission path;

an optical receiving device including an optical receiving portion and a light collecting portion that focuses light inputted from the light transmission path onto the optical receiving portion independent of an input angle of the light; and a mechanical portion changes a relative position between the light transmission path and the optical receiving portion.

The 14th aspect of the present invention is the receiving apparatus according to the 13th aspect of the present invention, wherein the optical receiving device is the optical receiving device according to the 1st aspect of the present invention.

The 15th aspect of the present invention is the receiving apparatus according to the 13th aspect of the present invention, wherein the mechanical portion includes a mechanism that relatively rotates an output direction of the light transmission path around the optical receiving portion.

The 16th aspect of the present invention is the receiving apparatus according to the 13th aspect of the present invention, wherein the mechanical portion includes a mechanism that relatively rotates an output direction of the light transmission path around an optical axis of the optical receiving portion.

According to the present invention, there is provided an optical receiving device, a free space optics transmission apparatus and a receiving apparatus capable of precisely receiving incident light as independent of the angle of incidence as possible without using an optical lens.

BRIEF DESCRIPTION OF THE DRAWINGS

FIG. 2A is a schematic view for explaining the relationship in the reciprocal lattice space between the dispersion plane and the propagation direction associated with a light collector of the optical receiving device according to the first embodiment of the present invention, and FIG. 2B is a schematic view for explaining the relationship in the real space between the dispersion plane and the propagation direction associated with the light collector of the optical receiving device according to the first embodiment of the present invention;

FIG. 3A shows a dispersion curve in a Brillouin zone of a photonic crystal in the on-optical axis dispersion plane of the light collector of the optical receiving device according to the first embodiment of the present invention, and FIG. 3B shows the shape of the Brillouin zone in the reciprocal lattice space in the on-optical axis dispersion plane of the light collector of the optical receiving device according to the first embodiment of the present invention;

FIG. 4A shows a dispersion curve in the Brillouin zone of the photonic crystal in the off-axis dispersion plane of the light collector of the optical receiving device according to the first embodiment of the present invention, and FIG. 4B shows the shape of the Brillouin zone in the reciprocal lattice space in the off-axis dispersion plane of the light collector of the optical receiving device according to the first embodiment of the present invention;

Figure 1:
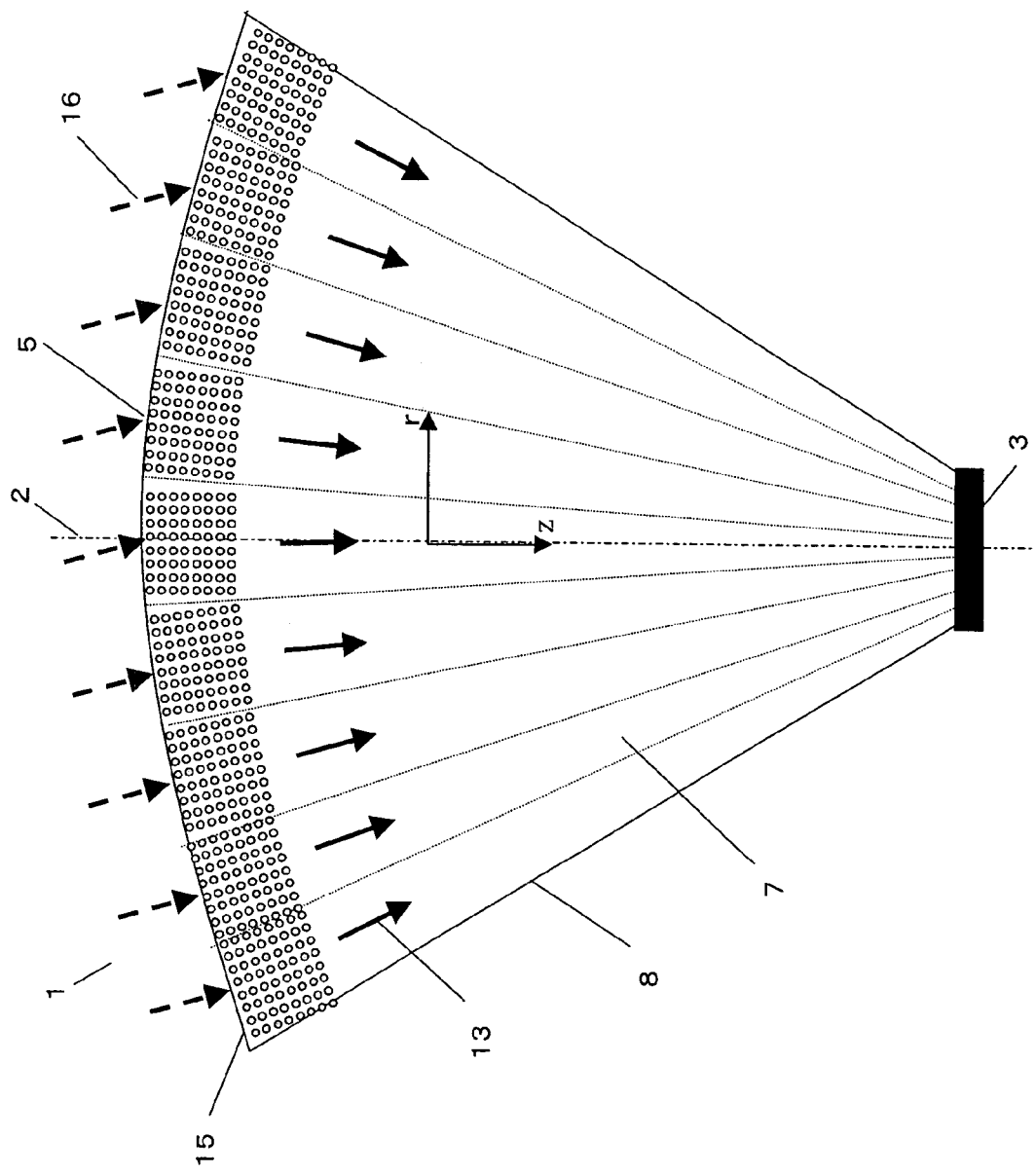
FIG. 1 is a schematic configuration diagram of the optical receiving device according to a first embodiment of the present invention.

DESCRIPTION OF SYMBOLS 1 free space
2 optical axis of optical receiving element
3 optical receiving element
4, 24 first basic lattice vector
5 incident position
6 square lattice
7, 27 photonic crystal
8, 28 light collector
9 Brillouin zone (BZ)
10 specific direction X of BZ of square lattice
11 specific direction M of BZ of square lattice
12 dispersion plane of light collector
13, 23 propagating light in light collector
14 dispersion plane of air
15 interface
16 incident light
17 second basic lattice vector
18 interior angle
22 dispersion plane of light collector (orthorhombic lattice)
50 input light transmission path (before rotation)
51 input light transmission path (after rotation)
52 light collector
53 optical receiving element
54 input surface
55 optical axis
56 gap
57 incident light (before rotation)
58 incident light (after rotation)
59 autorotation
60 longitudinal rotation
61 lateral rotation
62 center of rotation

PREFERRED EMBODIMENT OF THE INVENTION

Embodiments of the present invention will be described below with reference to the drawings.

First Embodiment

FIG. 1 is a schematic configuration diagram of the optical receiving device according to a first embodiment of the present invention.

FIG. 2 is a schematic view for explaining the dispersion plane and the propagation direction associated with a light collector of the optical receiving device of the first embodiment. FIG. 2A shows the reciprocal lattice space, and FIG. 2B shows the real space.

FIG. 3 is a schematic view of the on-optical axis dispersion plane of the optical receiving device of the first embodiment. FIG. 3A shows a dispersion curve in a Brillouin zone of a photonic crystal, and FIG. 3B shows the shape of the Brillouin zone in the reciprocal lattice space.

FIGS. 4A and 4B are schematic views of the off-axis dispersion plane of the optical receiving device of the first embodiment. FIG. 4A shows a dispersion curve in the Brillouin zone of the photonic crystal, and FIG. 4B shows the shape of the Brillouin zone in the reciprocal lattice space.

In the figures, the same components have the same reference characters.

Firstly, the configuration of the optical receiving device of the first embodiment will be described with reference to FIGS. 1 to 4.

The optical receiving device of the first embodiment is disposed apart from a light source (not shown) in a free space 1, and includes an optical receiving element 3 and a light collector 8 disposed in the vicinity of the plane of incidence of the optical receiving element 3, as shown in FIG. 1.

The light collector 8 receives parallel incident light 16 at an interface 15. The light collector 8 includes a cluster of photonic crystals 7, which has its first basic lattice vector 4 varying dependent on the incident position and parallel to the direction starting from an incident position 5 and pointing to the optical receiving element 3, and has different refractive indices periodically distributed in a square lattice 6.

The plane of incident of the optical receiving element 3 corresponds to an example of the optical receiving surface of the present invention, and the light collector 8 corresponds to an example of the optical collecting portion of the present invention. The interface 15 of the light collector 8 corresponds to an example of the input surface of the present invention, and the incident position 5 corresponds to an example of an arbitrary point on the input surface of the present invention. The first basic lattice vector 4 corresponds to an example of the first lattice vector of the present invention. The photonic crystals 7 arranged in the square lattice 6 correspond to an example of photonic crystals configured in the form of a regular n-polygonal lattice of the present invention.

The arrangement of the light collector 8 is not limited to a specific one as far as the light that exits from the output surface of the light collector 8 is incident on the plane of incidence of the optical receiving element 3. For example, the output surface of the light collector 8 may be in contact with or may be disposed in the vicinity of the plane of incidence of the optical receiving element 3.

In the square-lattice photonic crystal 7 in which the direction of the first basic lattice vector 4 changes to be parallel to the direction starting from the incident position 5 and pointing to the optical receiving element 3, the ratio of the wave number A in the X direction 10 to the wave number B in the M direction 11 in a Brillouin zone (BZ) 9 of the dispersion plane in a predetermined wavelength range is about $\sin(\pi/4)$, and the first basic lattice vectors 4 are disposed to be symmetric with respect to the optical axis of the optical receiving element 3. It is noted that since the optical receiving device of the first embodiment has optical-axis symmetry, FIG. 1 is a cross-sectional view including the optical axis 2 of the optical receiving device.

Each block partitioned by the dotted lines shown in FIG. 1 and divided for each incident position 5, in which the normal to the flat dispersion plane is parallel to the direction starting from the incident position 5 and pointing to the optical receiving element 3, corresponds to an example of the block including part of the input surface and part of the output surface according to the present invention.

These blocks are arranged such that a line of each block connecting a point on the interface 15 of the block, for example, the midpoint of the interface 15, to the midpoint of the output surface of the block disposed in the vicinity of the plane of incidence of the optical receiving element 3 is not parallel to other lines and these lines converge from the interfaces 15 of the light collector 8 in the direction toward the optical receiving element 3. Therefore, the line connecting an arbitrary point on the input surface of each block to the optical receiving point where the light incident on the arbitrary point and outputted from the output surface of the light collector 8 is incident on the optical receiving element 3 will cross the perimeter of the block only at two points, that is, the point on the input surface and the point on the output surface of the light collector 8.

Although FIG. 1 shows an example where the light collector 8 is divided into blocks having respective flat dispersion planes whose normals are oriented in the same direction for the sake of easily drawing the figure, a better configuration will be obtained by reducing the block dividing interval to zero and allowing the structure of the photonic crystal 7 to change in such a way that the directions of the normals to the flat dispersion planes continuously change.

As far as the dispersion plane in the incident direction is flat and the normal to the dispersion plane is parallel to the direction starting from the incident position 5 and pointing to the optical receiving element 3, the interface 15 on which the incident light 16 is incident may be a curved surface as shown in FIG. 1, a flat surface or an arbitrarily shaped surface.

Next, light propagation mechanism in the light collector 8, in which the first basic lattice vector 4 of the square-lattice photonic crystal 7 changes to be parallel with the direction starting from the incident position 5 and pointing to the optical receiving element 3, will be described by using a two-dimensional model with reference to FIGS. 2 to 4.

Firstly, a light ray incident on the optical axis 2 of the optical receiving element 3 will be described.

In general, the dispersion curve in a BZ of a square-lattice photonic crystal is as illustrated in FIG. 3A, and the wave numbers in the X and M directions at a predetermined wavelength (frequency) $\omega 1$ are A and B, respectively. The shape of the BZ in the reciprocal lattice space is square as shown in FIG. 3B. The X direction is the midpoint of the line of the square BZ, and the M direction is the diagonal point of the square BZ. Therefore, when the photonic crystal 7 is designed such that the ratio of A to B is $\sin(\pi/4)$, the dispersion plane 12 of the square-lattice photonic crystal 7 becomes a square approximately indicated by the thick solid line that is round in the M direction and flat in the X direction, because the dispersion plane 12 is a curved plane defined by an asymptotic plane that is a sphere whose center and radius are a proximal reciprocal lattice point and the wave number, respectively.

When the light ray is incident on the optical axis 2 in a misaligned manner, the momentum of the light ray in the tangential direction of the interface 15 (the direction perpendicular to the optical axis 2) is preserved, so that the component of the wave number perpendicular to the optical axis 2 will not change in the light collector 8. Therefore, the direction of the propagating light 13 in the light collector 8 is the direction in which the dispersion plane 12 inclines (the direction of the normal to the dispersion plane 12) at the intersection of the line parallel to the optical axis 2 and passing through the point where the incident light 16 crosses the circular dispersion plane 14 of the air and the square dispersion plane 12 of the square-lattice photonic crystal 7. That is, even when the angle of incidence changes and hence the position on the dispersion plane 14 of the air changes, the direction of the normal to the dispersion plane 12 is fixed and coincides with the direction of the optical axis 2 in the light collector 8, so that light incident at an arbitrary angle on the optical axis 2 always propagates in the direction of the optical axis 2 and is coupled with the optical receiving element 3.

Next, the light ray incident at a position apart from the optical axis 2 will be described.

In FIGS. 2A and 2B, $r_1$ indicates the position in the direction r relative to the optical axis 2. On the right side of the optical axis 2, $r_1 > 0$, while on the left side of the optical axis 2, $r_1 < 0$.

The direction of the first basic lattice vector 4 ($a_1(r_1)$) of the square-lattice photonic crystal 7 at the incident position apart from the optical axis 2 by $r=r_1$ is the direction starting from the incident position $r=r_1$ and pointing to the optical receiving element 3, as shown in FIG. 2B. In this case, although the dispersion curve in the BZ of the square-lattice photonic crystal 7 is, as shown in FIG. 4A, the same as that shown in FIG. 3A where the incident position is on the optical axis 2, the square BZ inclines to the tangential direction of the interface 15 as shown in FIG. 4B, so that the square dispersion plane 12 also inclines to the tangential direction of the interface 15.

From the relationship between the dispersion plane 14 of the air and the inclined dispersion plane 12 of the square lattice, the light ray incident on a position apart from the optical axis 2 propagates in the direction perpendicular to the inclined, flat dispersion plane 12 of the square lattice, that is, the direction starting from the incident position 5 and pointing to the optical receiving element 3, independent of the angle of incidence.

Since the optical receiving device is configured to have optical-axis symmetry, the mechanism in a three-dimensional optical receiving device is similar to that in the two-dimensional model.

In this way, use of the light collector 8 in which the direction of the normal to the flat dispersion plane 12 specific to the photonic crystal 7 is distributed such that the direction is oriented in the direction starting from the incident position and pointing to the optical receiving element 3 allows incident light in its entirety to propagate in the direction toward the optical receiving element 3 and to be coupled therewith independent of the angle of incidence with respect to the light collector 8.

Although the above description has been made with reference to a square lattice, a photonic crystal having three or more degrees of high symmetry like a trigonal lattice can similarly utilize its dispersion characteristic in the vicinity of the band end in order to orient the normal to the flat dispersion plane in the direction of the first basic lattice vector. Therefore, by distributing the first basic lattice vector of the photonic crystal having a three or more degree of high symmetry in the light collector to be oriented in the direction starting from the incident position and pointing to the optical receiving element, the incident light can be coupled with the optical receiving element independent of the incident position. That is, by distributing the photonic crystal in the form of a regular n-polygonal lattice (n is a natural number equal to or greater than three and representative examples of the natural number are n=3, 4 and 6) in such a way that the first basic lattice vector of the photonic crystal is oriented in the direction starting from the incident position and pointing to the optical receiving element, incident light can be coupled with the optical receiving element independent of the incident position.

Second Embodiment

Figure 5:
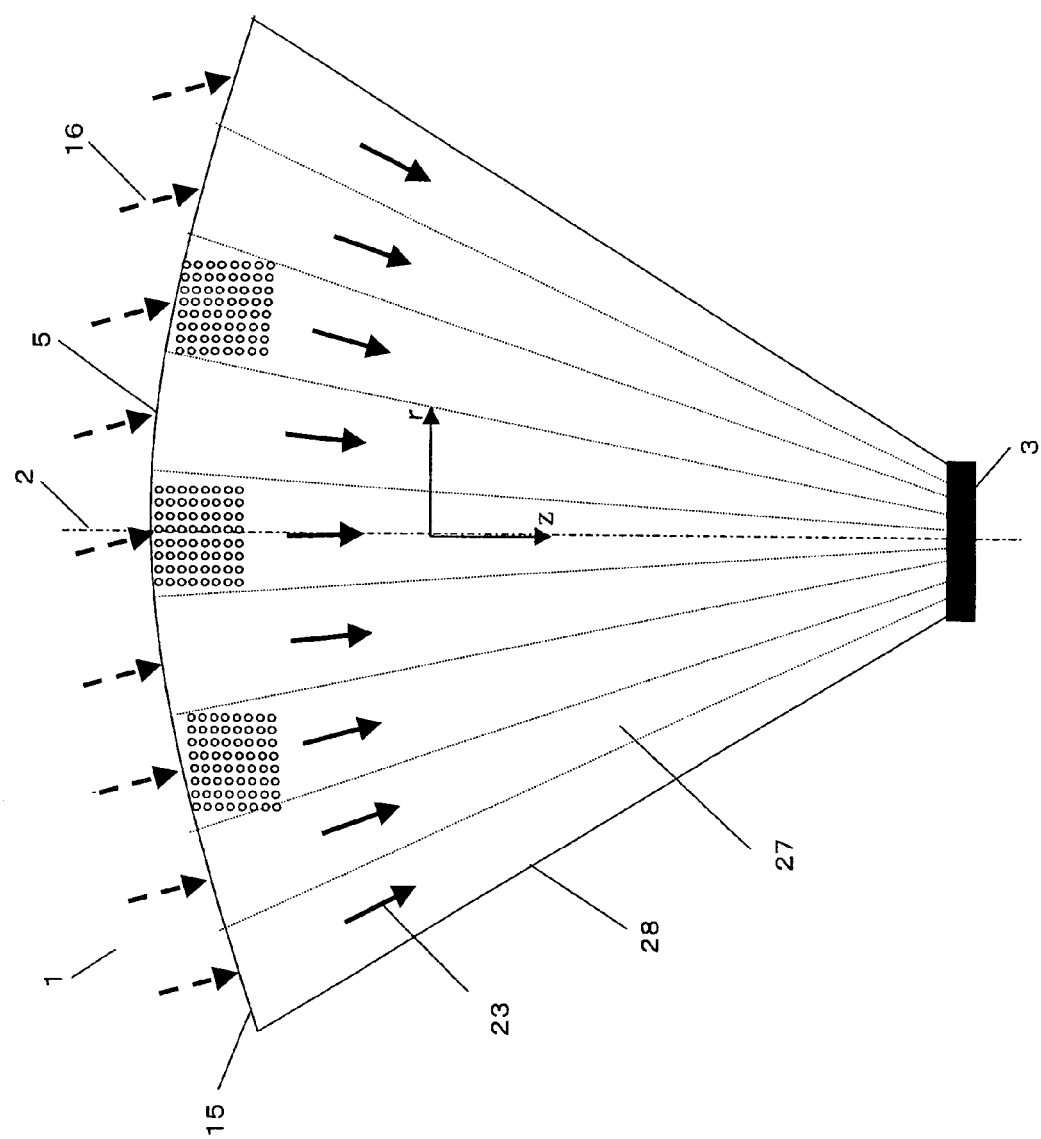
FIG. 5 is a schematic configuration diagram of the optical receiving device according to a second embodiment of the present invention.

FIG. 5 is a schematic configuration diagram of the optical receiving device according to a second embodiment of the present invention.

FIGS. 6A and 6B are schematic views for explaining the dispersion plane and the propagation direction associated with a light collector of the optical receiving device of the second embodiment. FIG. 6A shows the reciprocal lattice space, and FIG. 6B shows the real space.

Figure 7:
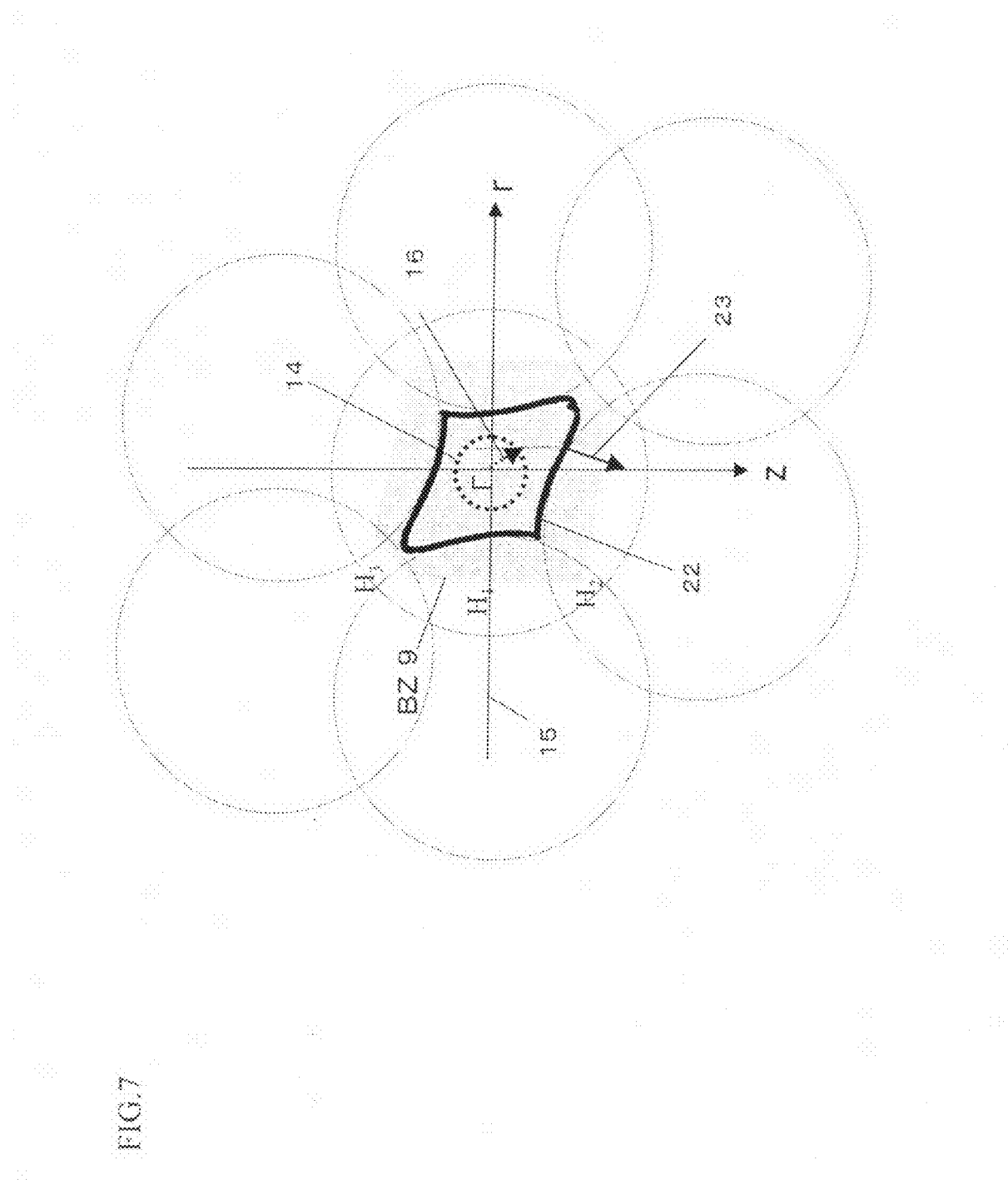
FIG. 7 is a schematic configuration diagram of the off-axis dispersion plane of the light collector of the optical receiving device according to the second embodiment of the present invention.

FIG. 7 is a schematic view of the off-axis dispersion plane of the optical receiving device of the second embodiment.

In the figures, the same components have the same reference characters.

Figure 6:
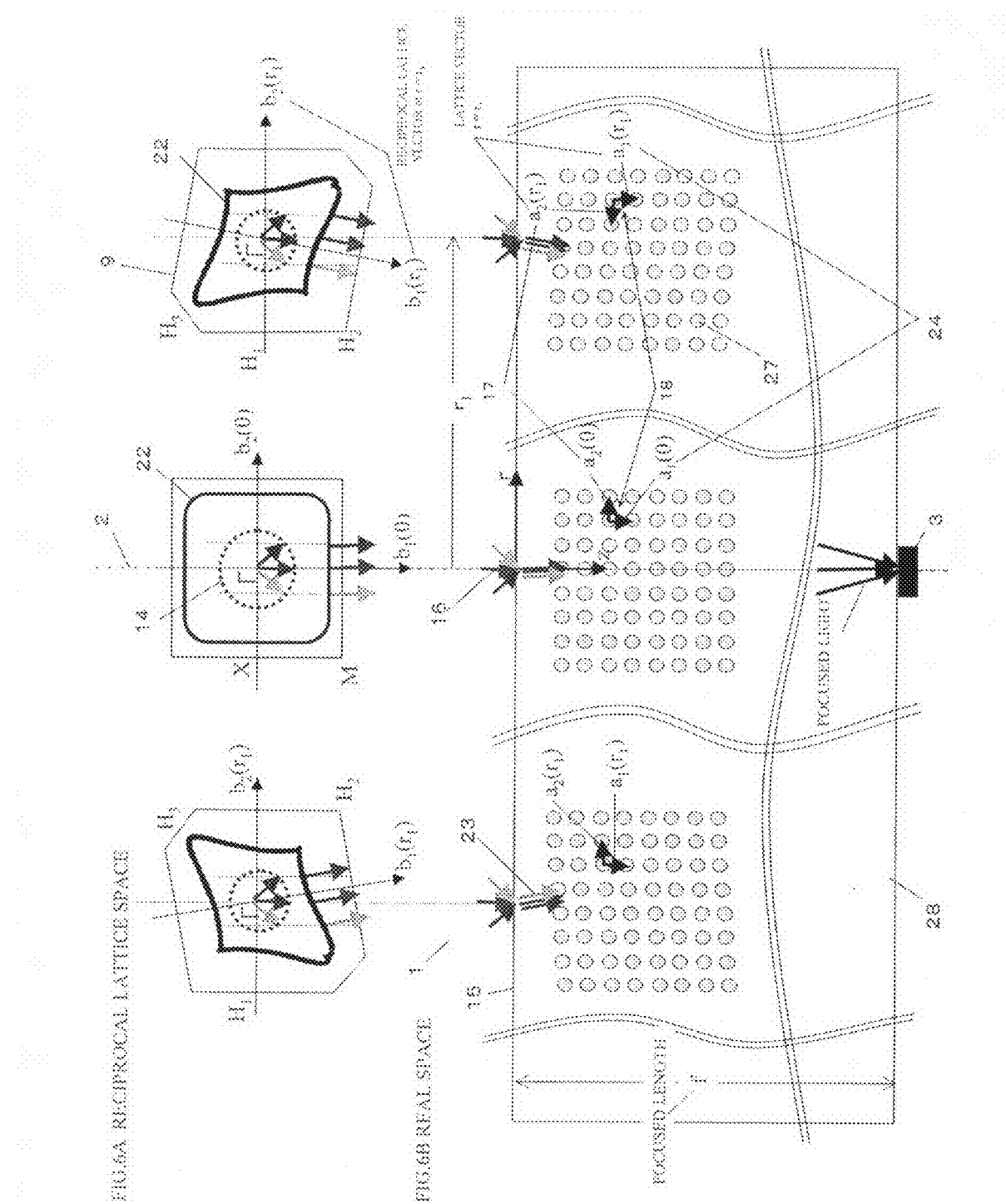
FIG. 6A is a schematic view for explaining the relationship in the reciprocal lattice space between the dispersion plane and the propagation direction associated with a light collector of the optical receiving device according to the second embodiment of the present invention.
FIG. 6B is a schematic view for explaining the relationship in the real space between the dispersion plane and the propagation direction associated with the light collector of the optical receiving device according to the second embodiment of the present invention.

Firstly, the configuration of the optical receiving device of the second embodiment will be described with reference to FIGS. 5 to 7.

The optical receiving device of the second embodiment differs from the optical receiving device of the first embodiment in terms of the layout of the photonic crystal in the light collector.

The optical receiving device of the second embodiment is disposed apart from a light source (not shown) in the free space 1, and includes the optical receiving element 3 and a light collector 28 disposed in the vicinity of the plane of incidence of the optical receiving element 3, as shown in FIG. 5.

The light collector 28 includes a cluster of photonic crystals 27 and having two or smaller degrees of symmetry and having different refractive indicates periodically distributed. In each of the photonic crystals 27, the first basic lattice vector 24 varying dependent on the incident position 5 is parallel to the optical axis 2 of the optical receiving element 3, and the interior angle 18 formed by a second basic lattice vector 17 and the first basic lattice vector 24 in the direction toward the optical receiving element 3 is 90° when the incident position is on the optical axis 2, while the interior angle is greater than 90° but smaller than 120° when the incident position is apart from the optical axis 2.

The first basic lattice vector 24 corresponds to an example of the first lattice vector of the present invention, and the second basic lattice vector corresponds to an example of another lattice vector of the present invention.

Then, photonic crystal 27 is configured to have a lattice constant that is 0.4 to 0.6 times a predetermined wavelength and a circle having a radius of 0.08 to 0.3 times the predetermined wavelength on a lattice point, and the second basic lattice vector 17 whose direction is determined by the direction starting from the incident position 5 and pointing to the optical receiving element 3 is disposed to be symmetric with respect to the optical axis 2. It is noted that since the optical receiving device of the second embodiment has optical-axis symmetry, FIG. 5 is a cross-section view including the optical axis 2 of the optical receiving device.

Next, the propagation direction of a light ray in the light collector 28 of the optical receiving device of the second embodiment will be described using the two-dimensional model shown in FIGS. 6 and 7.

Firstly, a light ray incident on the optical axis 2 of the optical receiving element 3 will be described.

Since the photonic crystals 27 is configured to have a square lattice in which the first basic lattice vector 24 of the photonic crystal 27 on the optical axis 2 in the light collector 28 is parallel to the optical axis 2, the propagation direction and the mechanism are the same as those in the first embodiment.

Next, the case where the incident position of a light ray is apart from the optical axis 2 by $r=r_1$ will be described.

In FIGS. 6A and 6B, $r_1$ indicates the position in the direction r with respect to the optical axis 2. The part to the right of the optical axis 2 indicates the case where $r_1>0$, and the part to the left indicates the case where $r_1<0$.

When the interior angle formed by the first basic lattice vector 24 and the second basic lattice vector 17 of the photonic crystal 27 in the direction toward the optical receiving element 3 is greater than 90° but smaller than 120°, the number of specific directions of the BZ9 is three (H1, H2 and H3). When the photonic crystal 27 is configured to have a lattice constant that is 0.4 to 0.6 times a predetermined wavelength and a circle having a radius of 0.08 to 0.3 times the predetermined wavelength on a lattice point, the dispersion curve of the photonic crystal made of typical solid material having a refractive index of about 1.0 to 3.0 is situated in the vicinity of the band end at the predetermined wavelength. The dispersion plane 22 at the predetermined wavelength is, as shown in FIG. 7, a curved surface defined by an asymptotic plane that is a sphere whose center and the radius are a proximal reciprocal lattice point and the wave number, respectively, so that the dispersion plane 22 will be the shape indicated by the thick solid line in which the directions H2 and H3 are approximately hyperbolic or curved and the direction H1 is substantially flat.

Thus, when the photonic crystal has less than three degrees of symmetry, for example, the interior angle formed by the first basic lattice vector 24 and the second basic lattice vector 17 is 90° or 60°, the direction of the normal to the flat dispersion plane 22 in the vicinity of the band end is oriented in the direction of the interior angle greater than 90°, that is, the direction toward the optical receiving element 3. The direction of the normal to the flat dispersion plane 22 specific to the vicinity of the band end is determined by the interior angle formed by the first basic lattice vector 24 and the second basic lattice vector 17. Therefore, by changing the interior angle 18 in the direction starting from the incident position 5 and pointing to the optical receiving element 3, the direction of the normal to the flat dispersion plane 22 can always be oriented in the direction toward the optical receiving element 3 independent of the incident position. It is noted that while circularly-shaped material is used to form the photonic crystal 27 in the above description, the shape of the material, which is responsible for refractive index periodicity, may be arbitrary selected because slight modification can provide a similar effect as far as the size is similar.

In this way, use of the light collector 28 in which the direction of the normal to the flat dispersion plane 22 specific to the photonic crystal 27 is distributed such that the direction of the normal is oriented in the direction starting from the incident position 5 and pointing to the optical receiving element 3 allows incident light in its entirety to propagate in the direction toward the optical receiving element 3 and to be coupled therewith independent of the angle of incidence with respect to the light collector 28.

Since the optical receiving device of the second embodiment is configured to have optical-axis symmetry, the mechanism in a three-dimensional optical receiving device is similar to that in the two-dimensional model.

By designing the photonic crystal such that at a predetermined wavelength, the normal of the flat dispersion plane is parallel to the direction starting from the incident position and pointing to the direction toward the optical receiving element, while at the wavelength other than the predetermined wavelength, the normal to the tangential line of the dispersion plane at the wave number in the incident direction is oriented in directions other than the direction starting from the incident position and pointing to the direction toward the optical receiving element, it is possible to impart a filtering function to the light collector. Furthermore, by changing the focusing position for each wavelength and disposing an optical receiving element for each wavelength at the focusing position of that optical receiving element, it is possible to impart a demultiplexing function.

As described above, the optical receiving device according to the present invention uses a light collecting portion having a flat dispersion plane disposed such that the normal of the dispersion plane is parallel to the direction starting from the incident point and pointing to the direction toward the optical receiving element, allowing the incident light to propagate in the direction toward the optical receiving element and to be focused on the optical receiving element independent of the angle of incidence.

Therefore, the optical receiving device according to the present invention is useful in high speed transmission free of optical axis adjustment for off-optical axis light in free space optics transmission.

For example, use of the optical receiving device according to the present invention as an optical receiving unit of a free space optics transmission apparatus allows stable transmission of digital data at high speed.

Third Embodiment

Figure 8:
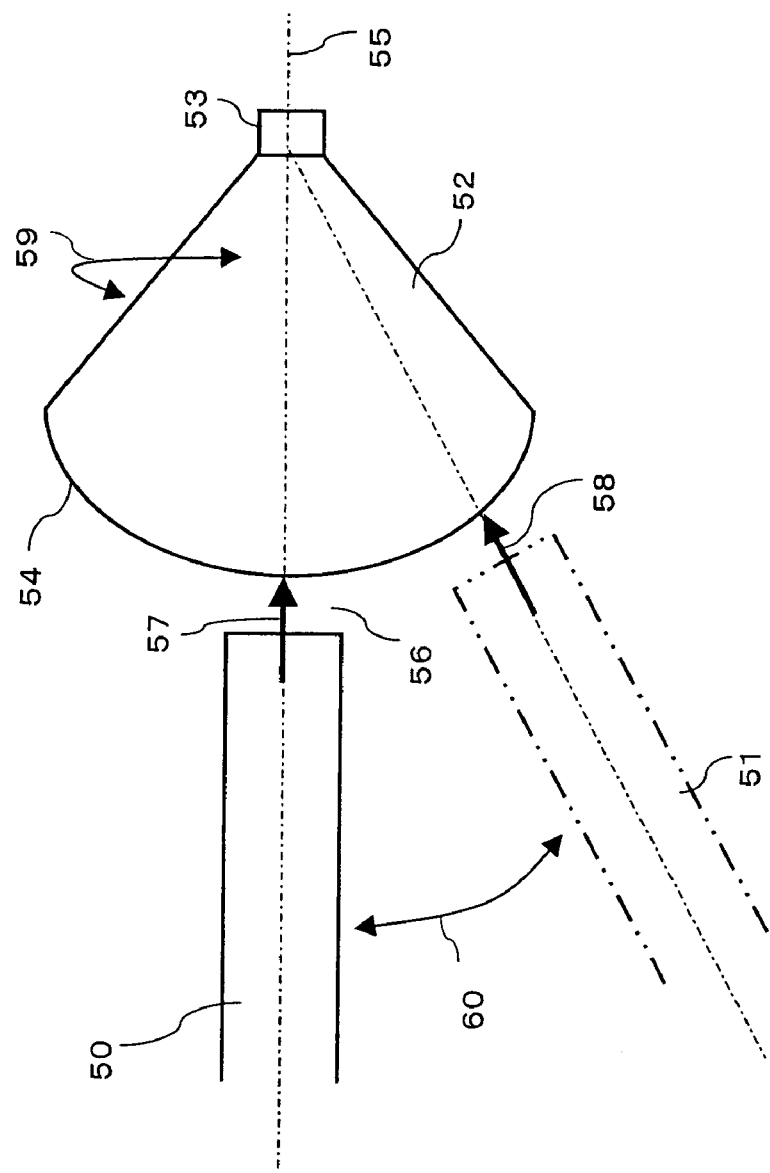
FIG. 8 is a schematic configuration diagram of a receiving apparatus according to a third embodiment of the present invention.
Figure 9:
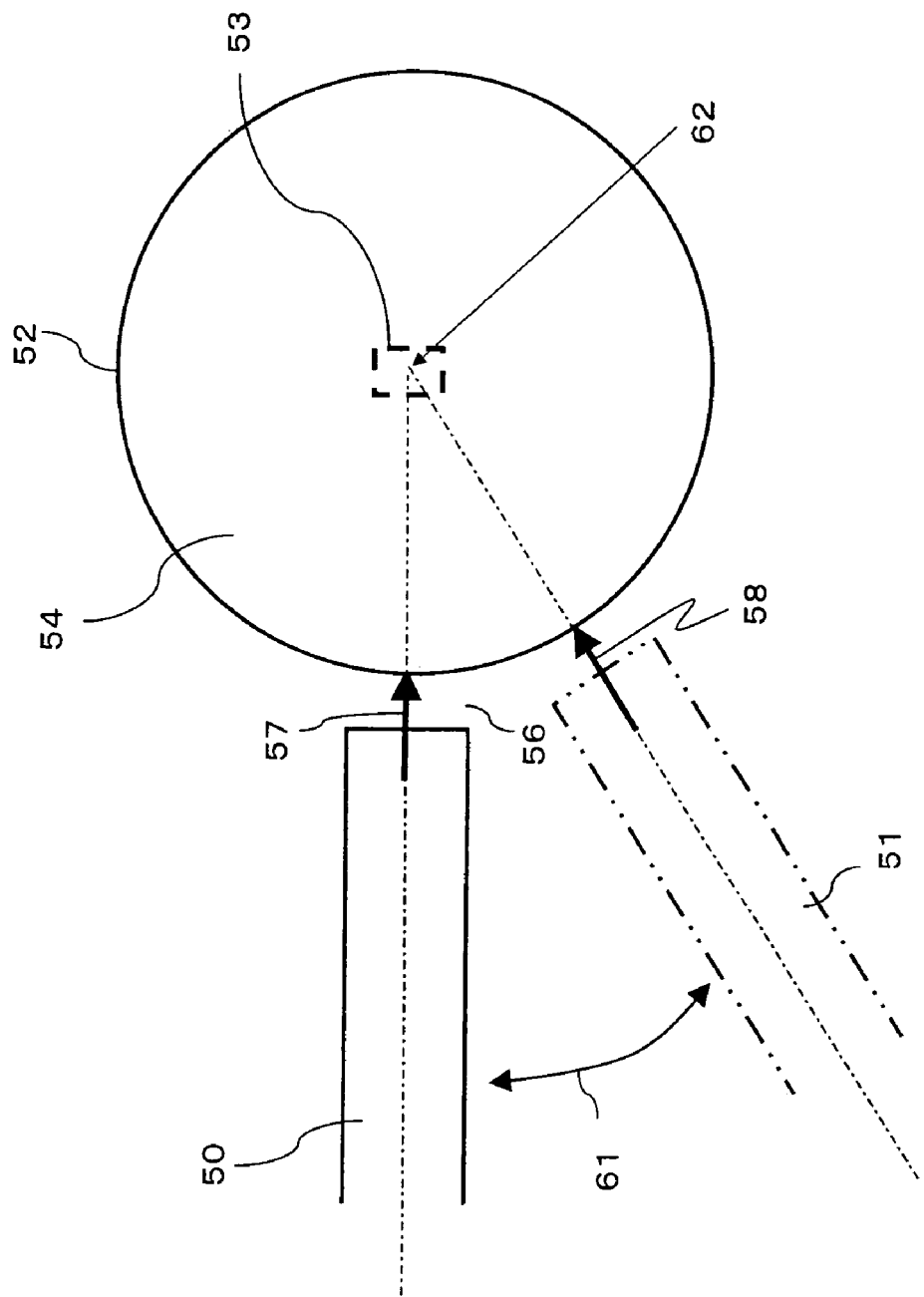
FIG. 9 is a schematic configuration diagram of a differently configured receiving apparatus according to a third embodiment of the present invention.
Figure 10A:
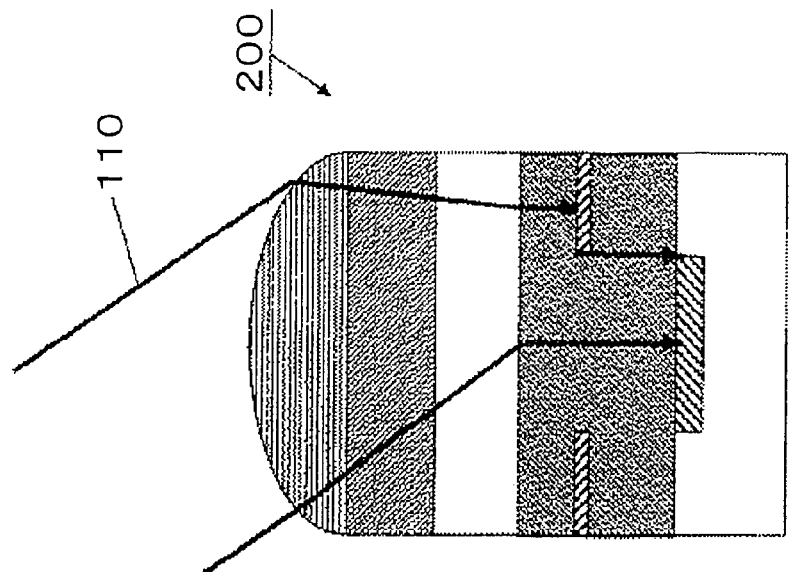
FIG. 10A is a cross-sectional view showing the behavior of incident light vertical incident on a conventional solid-state imaging element.
Figure 10B:
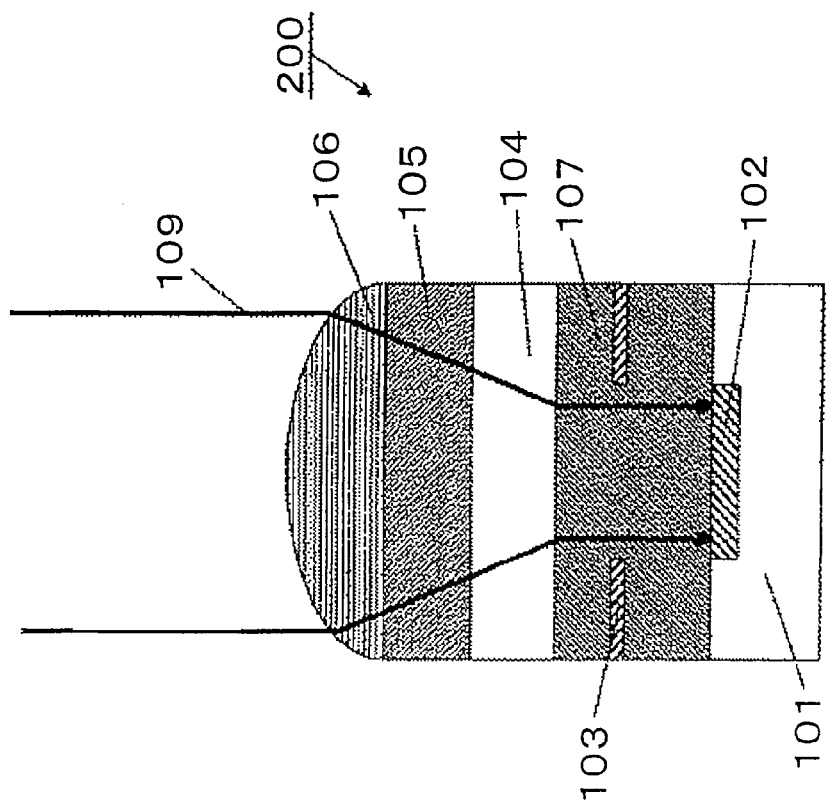
FIG. 10B is a cross-sectional view showing the behavior of incident light obliquely incident on the conventional solid-state imaging element.
Figure 11:
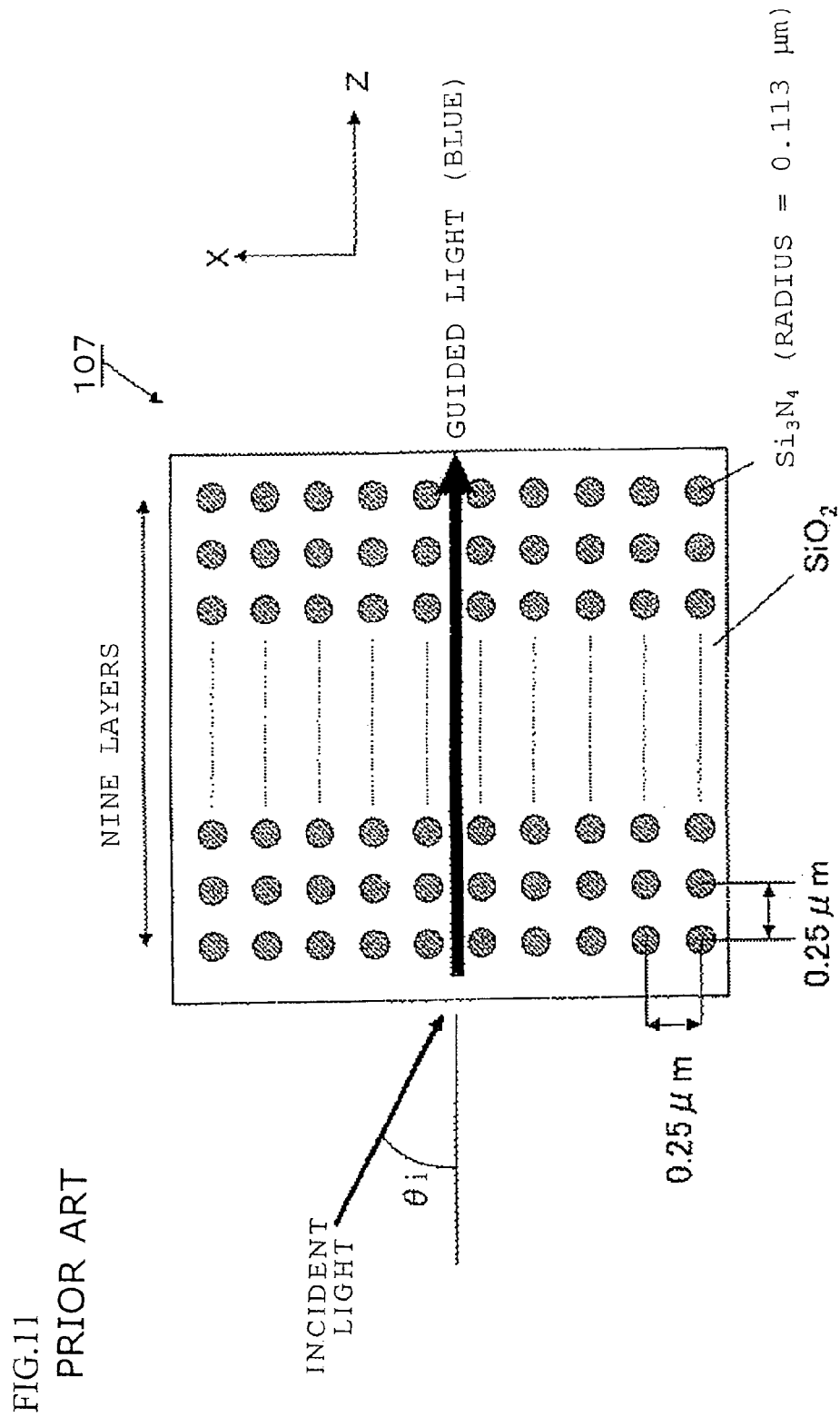
FIG. 11 shows a structure of a photonic crystal used in the conventional solid-state imaging element.
Figure 12:
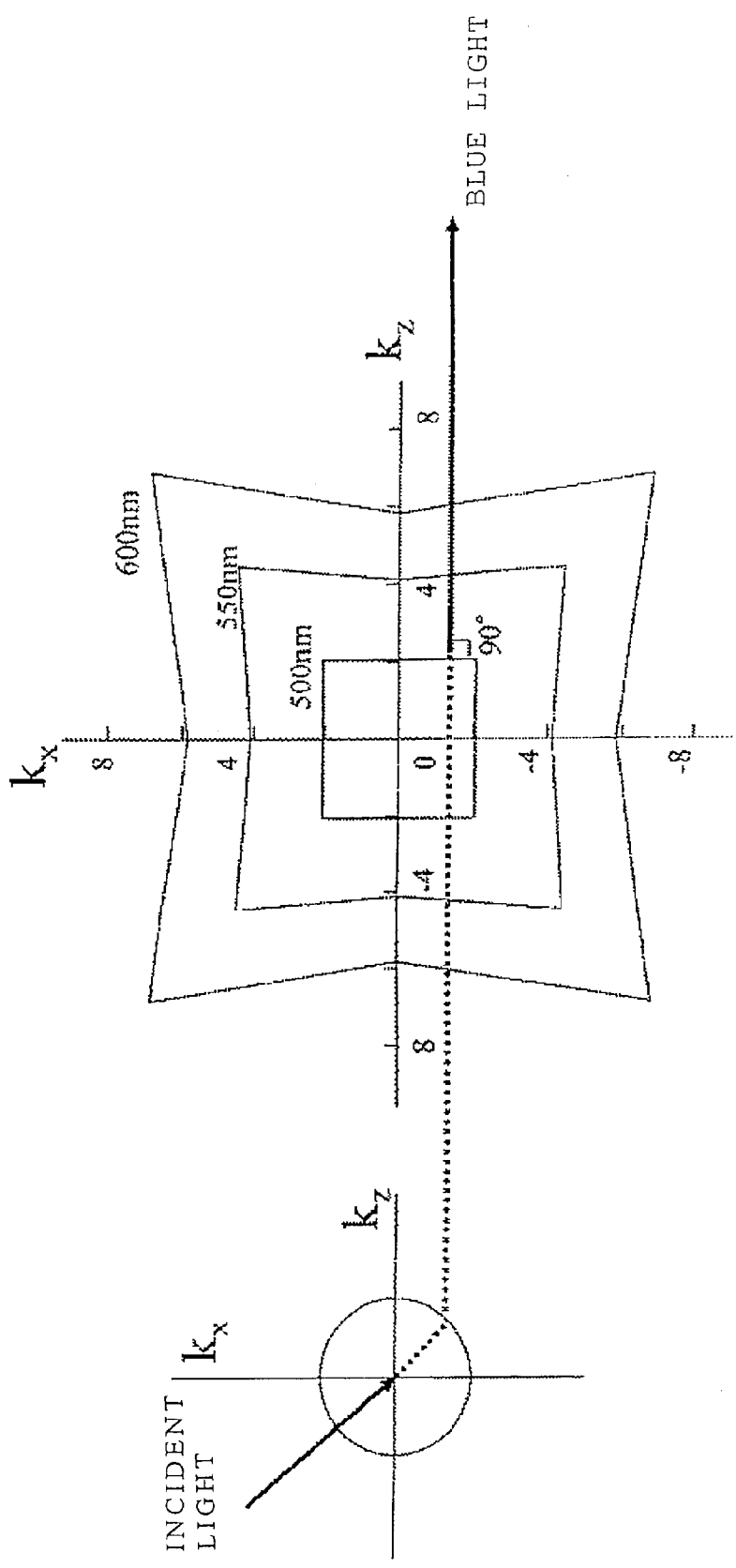
FIG. 12 shows the optical function of the photonic crystal used in the conventional solid-state imaging element.

FIGS. 8 and 9 are schematic configuration diagrams of the receiving apparatus according to a third embodiment of the present invention.

Each of the receiving apparatuses uses the optical receiving device of the first embodiment shown in FIG. 1 or the optical receiving device of the second embodiment shown in FIG. 5. That is, an optical receiving element 53 shown in FIGS. 8 and 9 is the optical receiving element 3 shown in FIGS. 1 and 5, and a light collector 52 is the light collector 8 or the light collector 28. An input surface 54 shown in FIGS. 8 and 9 is the interface 15 shown in FIG. 1. In FIGS. 8 and 9, the same components have the same reference characters.

The light collector 52 is formed of a cluster of three-dimensional photonic crystals such that light incident on the input surface 54 is focused onto the optical receiving element 53. Therefore, the light collector 52 is shaped into an approximate cone having the input surface 54 as its base.

The optical receiving device of the receiving apparatus shown in FIG. 8 is attached, for example, to the tip of an axle such that the optical receiving element 53 rotates. That is, the optical receiving device is attached such that the optical axis 55 of the optical receiving element 53 coincides with the axle.

Then, an input light transmission path 50 is disposed such that its output end is situated at a position apart from the input surface 54 of the light collector 52 by a gap 56.

The receiving apparatus shown in FIG. 8 includes a mechanism (not shown) that rotates the input light transmission path 50 relative to the optical receiving element 53 in such a way that the light output direction of the input light transmission path 50 rotates around the optical receiving element 53. That is, as indicated by longitudinal rotation 60, the mechanism moves the input light transmission path (before rotation) 50 to the position of the input light transmission path (after rotation) 51, and the incident light (before rotation) 57 that has been incident on the input surface 54 is now incident from another position, that is, incident light (after rotation) 58.

Since the optical receiving device also rotates around the optical axis 55 as indicated by autorotation 59, vibration of the axle and the like cause dynamic axis drift of the light outputted from the input light transmission path 50 with respect to the input surface 54 of the optical receiving device. Since the receiving apparatus of the third embodiment shown in FIG. 8 uses the optical receiving device according to the present invention shown in FIG. 1 or 5, the input light can be focused onto the optical receiving element 53 independent of the angle of the input light, allowing stable light reception without optical loss variation even when such axis drift occurs.

FIG. 9 shows a differently configured receiving apparatus of the third embodiment in which the output direction of the input light transmission path 50 rotates around the optical axis 55 of the optical receiving element 53.

FIG. 9 is a diagram viewed from the input surface 54 side of the optical receiving device. That is, FIG. 9 shows the optical receiving device viewed from above in the plane of FIG. 1, or a projection chart toward the top surface of the optical receiving device of FIG. 1. In this case, the output light from the input light transmission path 50 is incident on the input surface 54 of the optical receiving device diagonally from the front side or sideways in the plane of FIG. 9.

The receiving apparatus shown in FIG. 9 includes a mechanism (not shown) that rotates the input light transmission path 50 relative to the optical receiving element 53 such that the light output direction of the input light transmission path 50 rotates around the optical axis 55 of the optical receiving element 53 while keeping the angle between the light output direction and the optical axis 55 unchanged. That is, as indicated by lateral rotation 61, the mechanism moves the input light transmission path (before rotation) 50 to the position of the input light transmission path (after rotation) 51.

On the other hand, the optical receiving device includes a mechanism that moves the optical receiving device around the center of rotation 62, that is, the optical receiving element 53 shown in FIG. 9. In FIG. 9, the input surface 54 on the near side to the viewer from the plane of FIG. 9 moves around the center of rotation 62 on the far side apart from the plane of FIG. 9 such that the input surface 54 swings vertically, horizontally and in other directions.

The rotation of the input light transmission path 50 and the movement of the optical receiving device cause dynamic axis drift of the light outputted from the input light transmission path 50 on the input surface 54 of the optical receiving device. Since the receiving apparatus of the third embodiment shown in FIG. 9 also uses the optical receiving device according to the present invention shown in FIG. 1 or 5, the input light can be focused onto the optical receiving element 53 independent of the angle of the input light, allowing stable light reception without optical loss variation even when such axis drift occurs.

Since the receiving apparatus of the third embodiment can thus focus the input light onto the optical receiving element 53 independent of the angle of the input light, use of the receiving apparatus of the third embodiment allows stable light reception without optical loss variation even when the position of the input light transmission path relative to the optical receiving device dynamically changes, for example, when light transmission is applied to a rotator of a machine, a joint of a robot and the like.

In the receiving apparatus shown in FIGS. 8 and 9, the optical receiving portion shown as the optical receiving element 53 may be a light transmission path. Furthermore, the gap 56 between the output surface of the input light transmission path 50 and the input surface 54 of the light collector 52 may be evacuated or filled with gas or liquid.

Various other aspects of the present invention follow:

Another first aspect of the present invention is an optical receiving device including an optical receiving element, and a light collecting portion that is divided into blocks, each of which has a flat dispersion plane, wherein the normal to each of the dispersion planes is oriented to the optical receiving element, so that the light collecting portion focuses light incident at different angles onto the optical receiving element.

Another second aspect of the present invention is the optical receiving device of the other first aspect of the present invention configured such that the normals to the respective dispersion planes are symmetric about the optical axis of the optical receiving element.

Another third aspect of the present invention is the optical receiving device of the other first aspect of the present invention configured such that the light collecting portion is made of a photonic crystal whose crystal lattice changes in the direction starting from each incident point on which each of the light rays is incident and pointing to the optical receiving element.

Another fourth aspect of the present invention is the optical receiving device of the other third aspect of the present invention configured such that the photonic crystal has a regular n-polygonal lattice (n is a natural number equal to or greater than three) and a first lattice vector of the crystal lattice orients in the direction starting from each of the incident points and pointing to the optical receiving element.

Another fifth aspect of the present invention is the optical receiving device of the other fourth aspect of the present invention configured such that the regular n-polygonal lattice that forms the photonic crystal is a regular n-polygonal lattice that is determined by the direction starting from each of the incident points and pointing to the optical receiving element and the ratio of the maximum wave number to the minimum wave number in a specific direction of a Brillouin zone is $\sin(\pi/n)$.

Another sixth aspect of the present invention is the optical receiving device of the other third aspect of the present invention configured such that the photonic crystal has a crystal lattice having less than three degrees of symmetry. Each first lattice vector of the crystal lattice is parallel to the optical axis and orients to the optical receiving element, while another lattice vector of the crystal lattice is a lattice vector that changes depending on the direction starting from each of the incident points and pointing to the optical receiving element. The interior angle formed by the first lattice vector and the other lattice vector is 90° or greater.

Another seventh aspect of the present invention is the optical receiving device of the other sixth aspect of the present invention configured such that the photonic crystal is configured to have a lattice constant that is 0.4 to 0.6 times a predetermined wavelength and a circle having a radius of 0.08 to 0.3 times the predetermined wavelength on a lattice point.

Another eighth aspect of the present invention is the optical receiving device of any of the other third to seventh aspects of the present invention configured such that each of the lattice vectors of the crystal lattice of the photonic crystal is symmetric about the optical axis.

Another ninth aspect of the present invention is the optical receiving device of the other first aspect of the present invention configured such that the normals to the respective dispersion planes orient to the optical receiving element at a predetermined wavelength and the dispersion plane is wavelength-dependent.

Another tenth aspect of the present invention is the optical receiving device of the other ninth aspect of the present invention configured such that the light collecting portion focuses only light having the predetermined wavelength onto the optical receiving element.

Another eleventh aspect of the present invention is a free space optics transmission apparatus including an optical receiving unit having the optical receiving device according to the other first aspect of the present invention.

The optical receiving device, the free space optics transmission apparatus and the receiving apparatus according to the present invention provide an advantage of being capable of precisely receiving incident light as independent of the angle of incidence as possible without using an optical lens, and are useful as an optical receiving-device, a free space optics transmission apparatus, a receiving apparatus and the like used in free space optics transmission.

What is claimed is:

1. An optical receiving device comprising:

an optical receiving element; and a light collecting portion having an output surface close to or in contact with an optical receiving surface of the optical receiving element, wherein a dispersion plane at an arbitrary point on a line connecting an arbitrary point on an input surface of the light collecting portion to an optical receiving point where light inputted on the arbitrary point on the input surface is received on the optical receiving surface is flat, and the normal to the dispersion plane is parallel to the line.

2. The optical receiving device according to claim 1, wherein the light collecting portion is divided into blocks, each of which includes part of the input surface and part of the output surface, and a line connecting an arbitrary point on the input surface of each of the blocks to an optical receiving point where light inputted on the arbitrary point is received on the optical receiving surface of the optical receiving element crosses a perimeter of the block only at two points, that is, a point on the input surface and a point on the output surface.

3. The optical receiving device according to claim 1, wherein normals to the respective dispersion planes are symmetric about an optical axis of the optical receiving element.

4. The optical receiving device according to claim 1, wherein the light collecting portion is made of a photonic crystal whose crystal lattice changes as a direction of the line changes.

5. The optical receiving device according to claim 4, wherein the photonic crystal has a regular n-polygonal lattice (n is a natural number equal to or greater than three) and a first lattice vector of the crystal lattice orients in a direction toward the optical receiving point of the line.

6. The optical receiving device according to claim 5, wherein the regular n-polygonal lattice that configures the photonic crystal is a regular n-polygonal lattice that is determined by the direction of the line, and a ratio of a maximum wave number to a minimum wave number in a specific direction of a Brillouin zone is $\sin(\pi/n)$.

7. The optical receiving device according to claim 4, wherein the photonic crystal has a crystal lattice having less than three degrees of symmetry,
 a first lattice vector of the crystal lattice is parallel to an optical axis of the optical receiving element and orients toward the optical receiving element,
 another lattice vector of the crystal lattice is a lattice vector that changes according to the direction of the line, and
 an interior angle formed by the first lattice vector and the other lattice vectors is 90° or greater.

8. The optical receiving device according to claim 7, wherein the photonic crystal is configured to have a lattice constant that is 0.4 to 0.6 times a predetermined wavelength and a circle having a radius of 0.08 to 0.3 times the predetermined wavelength on a lattice point.

9. The optical receiving device according to claim 4, wherein each of lattice vectors of the crystal lattice of the photonic crystal are symmetric about an optical axis of the optical receiving element.

10. The optical receiving device according to claim 1, wherein normals to the respective dispersion planes are parallel to the line at a predetermined wavelength, and the dispersion plane is wavelength-dependent.

11. The optical receiving device according to claim 10, wherein the light collecting portion focuses only light having the predetermined wavelength onto the optical receiving element.

12. A free space optics transmission apparatus comprising an optical receiving unit having the optical receiving device according to claim 1.

13. A receiving apparatus comprising:
 a light transmission path;
 an optical receiving device including an optical receiving portion and a light collecting portion that focuses light inputted from the light transmission path onto the optical receiving portion independent of an input angle of the light; and
 a mechanical portion changes a relative position between the light transmission path and the optical receiving portion.

14. The receiving apparatus according to claim 13, wherein the optical receiving device is the optical receiving device according to claim 1.

15. The receiving apparatus according to claim 13, wherein the mechanical portion includes a mechanism that relatively rotates an output direction of the light transmission path around the optical receiving portion.

16. The receiving apparatus according to claim 13, wherein the mechanical portion includes a mechanism that relatively rotates an output direction of the light transmission path around an optical axis of the optical receiving portion.

* * * * *